Figure 4:
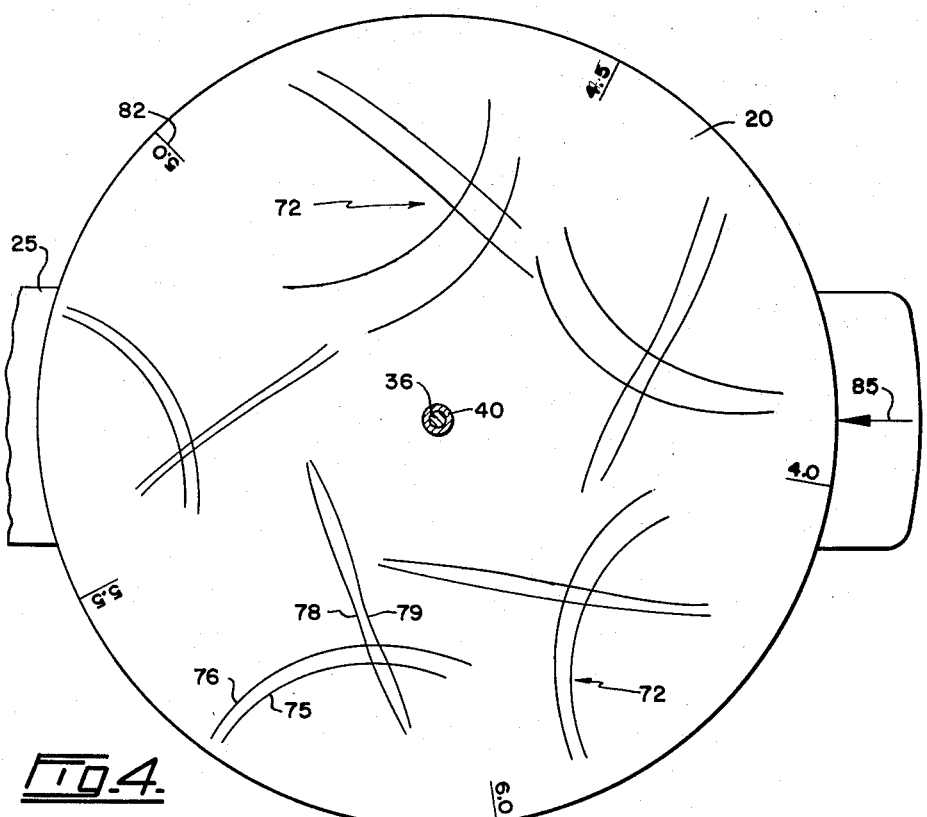

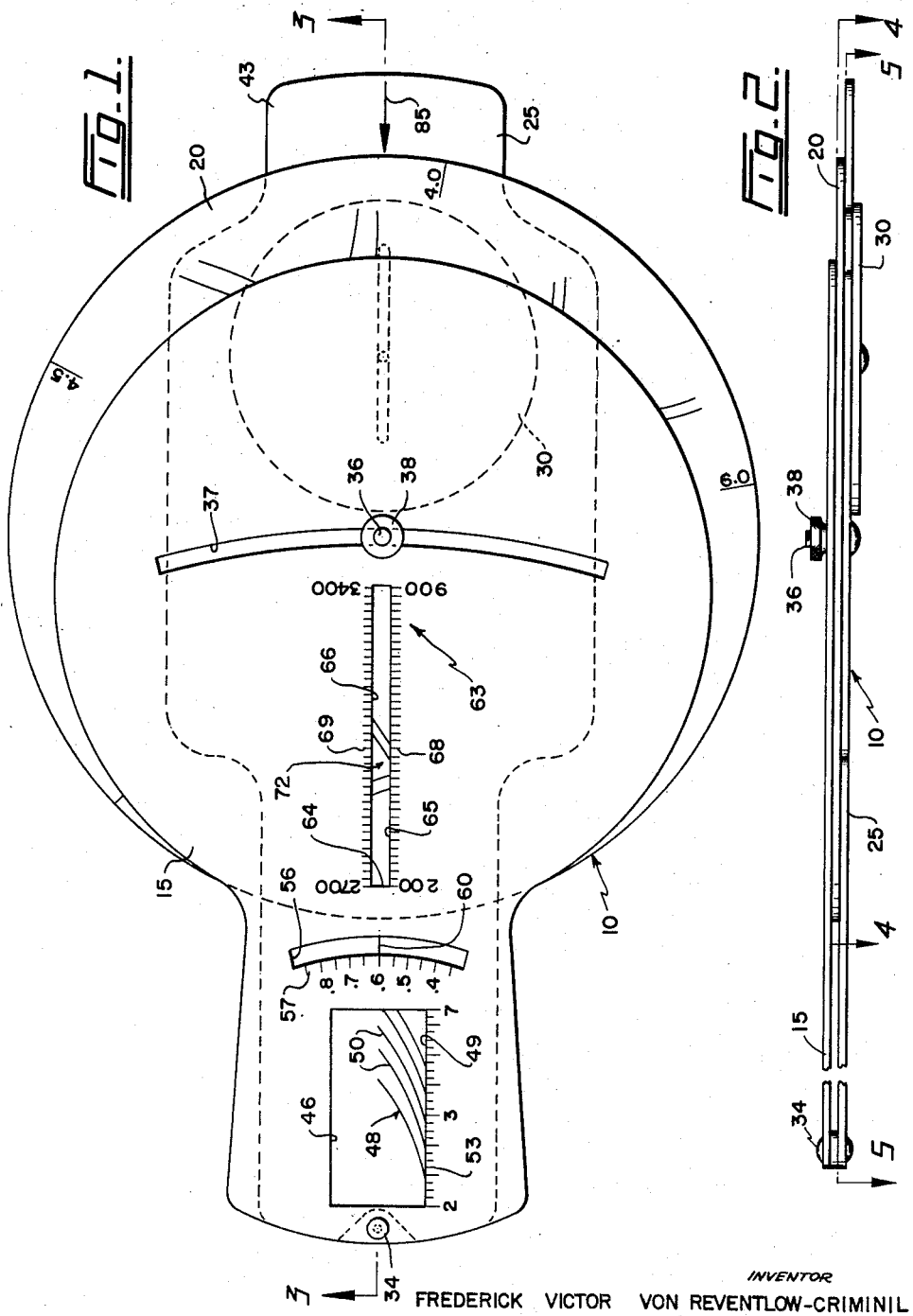

Jan. 14, 1964   F. V. VON REVENTLOW-CRIMINIL   3,117,721
CONCRETE CONSTITUENT INDICATOR
Filed Oct. 31, 1961   3 Sheets-Sheet 2
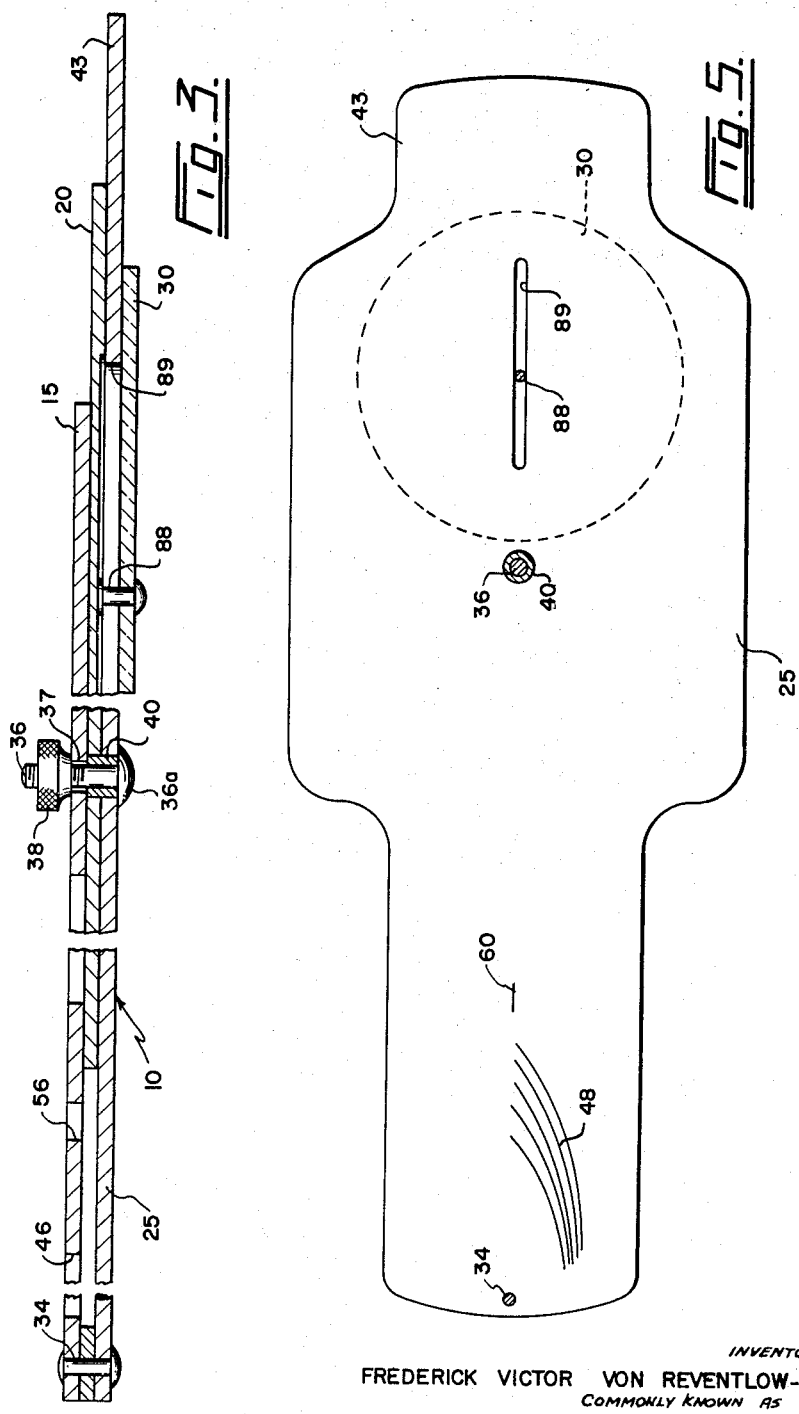
INVENTOR
FREDERICK VICTOR VON REVENTLOW-CRIMINIL
COMMONLY KNOWN AS
FREDERICK VICTOR REVENTLOW
BY
Featherstonhaugh & Co.
ATTORNEYS Jan. 14, 1964   F. V. VON REVENTLOW-CRIMINIL   3,117,721
CONCRETE CONSTITUENT INDICATOR
Filed Oct. 31, 1961   3 Sheets-Sheet 3

INVENTOR
FREDERICK VICTOR VON REVENTLOW-CRIMINIL
COMMONLY KNOWN AS
FREDERICK VICTOR REVENTLOW
BY
Fetherstonhaugh & Co.
ATTORNEYS

United States Patent Office 3,117,721
Patented Jan. 14, 1964

3,117,721
CONCRETE CONSTITUENT INDICATOR
Frederick Victor von Reventlow-Criminil, 13687 28th
Ave., R.R. 3, White Rock, British Columbia, Canada
Filed Oct. 31, 1961, Ser. No. 148,954
12 Claims. (Cl. 235—61)

This invention relates to a device for indicating the relative amounts of constituents for forming concrete of different strengths with varying cements and aggregates.

The quality of concrete depends on the proportions of the constituents therein, and especially the ratio of water to cement. The standard procedure for designing strength concrete is mainly by trial and error. Nearly all methods used require trial mixes to determine the combinations of cement, water and aggregate. Without precalculation of the water requirements of the aggregate used, trial mixes are bound to be incorrect and have to be adjusted many times by rather complicated and time consuming calculations. On the other hand, to precalculate the water requirements of each aggregate would be even more time consuming than the trial mixing method.

An object of the present invention is the provision of a device for determining the amounts of cement, sand, gravel and water necessary to obtain a concrete of a given compressive strength and a given plasticity while obtaining a correct yield.

Another object is to provide a concrete constituent indicator requiring only a single setting for each aggregate blend to indicate the correct proportions of cement, water and aggregate, regardless of the source of cement and/or aggregate.

Another object is the provision of a device which may be utilized to design strength concrete by using the inherent strength of the cement employed as a base for strength, and by calculating the cement/water paste requirements of aggregates with various gradations and shapes as a base for the consistency of the concrete.

A further object is the provision of a concrete constituent indicator which with one setting automatically indicates the correct amount of cement and aggregate for a predetermined water/cement ratio.

Yet another object is the provision of a device which will show the compressive strength of concrete obtainable when the cement content, fineness modulus and type of aggregate are known.

A still further object is the provision of a device which indicates the amount of aggregate and water required to obtain a cubic yard of concrete when the cement content and type of aggregate are known.

Yet another object is the provision of a device for determining the correct percentages of sand and gravel to produce an aggregate having a desired fineness modulus.

There are different kinds of Portland cement, and different batches of any one kind may have different inherent strengths. The definite relationship between the strength of cement and the water/cement ratio is well known, but different cements by the same or different manufacturers often have a different basic or inherent strength. This inherent strength of a cement can be determined by test in accordance with A.S.T.M. Des. C-109. The present indicator utilizes the inherent strength of the cement to be used to indicate the amount of water, aggregate and cement necessary to produce concrete of a desired strength.

The water requirements of a concrete consist of the water requirements of the cement and the water requirements of the aggregate. The necessary amount of water to obtain a desired consistency depends on the distribution and proportions of grain-sizes and their particle shapes within the aggregate used, i.e., aggregates with a large quantity of small grain-sizes will have a larger surface area and require more water than aggregate with less fines.

If water plus cement are considered as one unit, called water/cement paste or just "paste," concrete will consist of a mixture of aggregate and paste. In the range of practical concrete this paste considered by itself will always be of a semi-liquid consistency. In other words, as compared to the final consistency of the concrete, it will have an excess of water. The saturated surface-dry aggregate, however, has a definite water requirement, depending on its fineness modulus, and by mixing paste and aggregate, excess water and water requirement will equalize so that when the amount of paste has been determined correctly, the desired final consistency will be obtained. Therefore, the total fineness modulus of the aggregate used is an extremely important factor in determining the amount of cement and water for concrete of a desired strength.

Fineness modulus is a term used as an index to the fineness or coarseness of aggregate. It is the summation of the cumulative percentages of the material retained on the standard sieves divided by 100. It is not an indication of grading since a number of gradings will give the same value for fineness modulus, but suitable aggregates of the same fineness modulus will always have the same water requirements since the total surface areas thereof are the same.

This concrete constituent indicator utilizes the following factors:

(1) The volume of concrete produced by any combination of material, as long as the concrete is plastic, is equal to the sum of the absolute volume of the cement, plus the absolute volume of the aggregate, plus the volume of water.

(2) The strength of concrete is principally dependent on the inherent strength of the cement, the amount of mixing water and the extent to which the chemical physical reaction between the cement and water have progressed (age).

(3) The consistency of concrete is governed by the amount of cement/water paste and its plasticity.

(4) The amount of cement/water paste to obtain a certain plastic consistency depends on the fineness modulus of the aggregate and on the shape of the particles in the aggregate.

Each indicator is set up to produce wet concrete of a desired slump, for example, 2 inch to 3 inch slump, and an aggregate of a certain specific gravity, such as the bulk specific gravity of 2.65 on the basis of saturated, surface dry material.

A concrete constituent indicator according to the present invention includes means for indicating the water/cement ratio for cements of different strengths to produce concretes of different strengths, and means for indicating the quantities of aggregate and cement relative to the different cements and water/cement ratios used to produce different concretes according to the fineness modulus of the aggregate used. The device includes a group of strength lines representing different strengths of cement, and associated therewith graduations representing different concrete strengths. When the graduation of a desired concrete strength is moved to the line representing a certain strength of cement, the instrument indicates the maximum water/cement ratio. It also indicates the amount of aggregate in pounds per cubic yard and the amount of cement in pounds per cubic yard for an aggregate of a predetermined fineness modulus. The device may be set to indicate the amount of aggregate and cement for aggregates of different fineness moduli. If any of these factors are known regarding the constituents and the desired concrete, the instrument may be used to indicate any missing factor.

Figure 6:
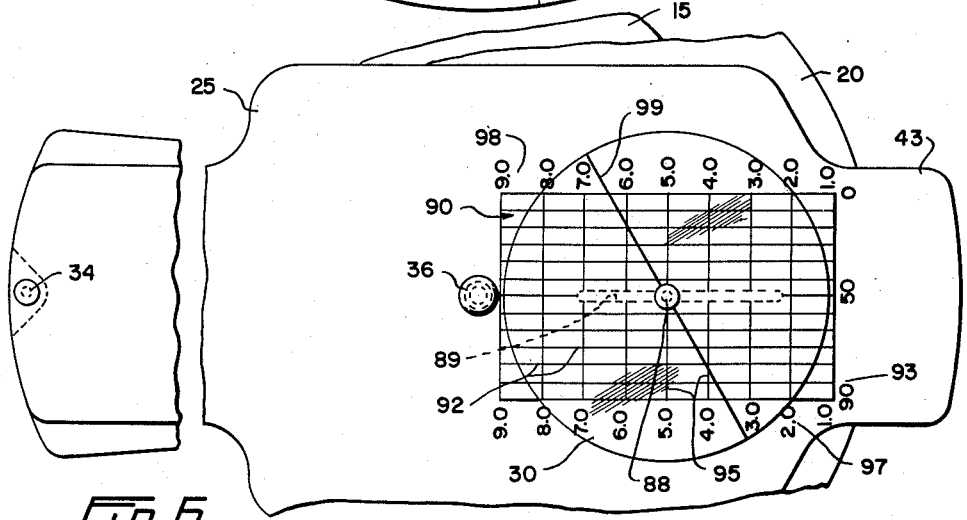

An example of this invention is illustrated in the accompanying drawings, in which:

FIGURE 1 is a top plan view of the device;
FIGURE 2 is a side elevation thereof;
FIGURE 3 is a longitudinal section taken on the line 3—3 of FIGURE 1;
FIGURE 4 is a horizontal section taken on the line 4—4 of FIGURE 2;
FIGURE 5 is a horizontal section taken on the line 5—5 of FIGURE 2; and
FIGURE 6 is a bottom plan view of the device.

Referring to the drawings, 10 is a concrete constituent indicator comprising an upper element 15, intermediate element 20, and lower element 25. Upper element 15 is movable relative to lower element 25, while element 20 is movable with element 25 and movable relative to the upper and lower elements. An auxiliary element 30 is both rotatable and shiftable relative to lower element 25.

In this example, upper and lower elements 15 and 25 are elongated and generally co-extensive, and are swingably connected to each other at adjacent ends thereof by a pin 34. Another pin 36 is secured to element 25 and extends upwardly through an arcuate slot 37 in upper element 15, the centre of curvature of this slot coinciding with pin 34. A nut 38 is threaded on pin 36 and may be tightened to fix the upper and lower elements relative to each other. Intermediate element 20, which is preferably in the form of a disc as shown, is rotatably mounted on pin 36 between elements 15 and 25. Element 20 may be held against rotation when nut 38 is tightened, but it is preferable to provide means which will allow the intermediate element to be rotated around pin 36 when the upper and lower elements are fixedly secured together. This may be accomplished by providing a sleeve 40 on pin 36 extending through disc 20 and between element 15 and a head 36a on said pin, see FIGURE 3. The intermediate element is actually rotatable on sleeve 40 and/or the latter is rotatable on pin 36. When nut 38 is tightened, element 15 is pressed against the adjacent end of sleeve 40, leaving element 20 free to rotate. It will be noted that the end 43 of element 25 remote from pin 34 projects outwardly beyond the adjacent edge of element 20, see FIGURE 1.

Upper element 15 has an opening 46 therein extending longitudinally thereof adjacent pin 34. This opening lies over a group 48 of strength lines so that an edge 49 of the opening extends across said lines. Each line 50 of group 48, which in this example is a curve, is plotted to indicate different inherent strength of cements when tested in accordance with Des. C-109 of the American Society for Testing Materials. In this example, there are five lines 50 in group 48 representing cements which render 3,000, 4,000, 5,000, 6,000 and 7,000 p.s.i. respectively. A plurality of graduations 53 extend along edge 49. These represent desired different strengths of concrete, e.g., 2,000 to 7,000 p.s.i.

A curved slot 56 is formed in upper element 15 adjacent the inner end of slot 46, the centre of curvature of slot 56 coinciding with pin 34. A water/cement ratio scale 57 extends along an edge of curved slot 56, this scale being expressed in decimals, e.g., .4 to .9. An indicator mark 60 is positioned on lower element 25 immediately beneath slot 56 so that it may be seen therethrough.

This indicator mark has a definite relationship to the group of lines 48 and graduations 53, as group of lines 48, graduation 53, scale 57, and indicator mark 60 serve together to solve a formula to predetermine compressive strength of concrete.

$$28 \text{ day comp. strength} = \frac{14{,}223}{X^{\frac{w}{c}}} = \log 14223 - \frac{w}{c} \log x$$

Factor X was found empirically to be:

17 for a cement with an inherent strength of 3,000 p.s.i.
12 for a cement with an inherent strength of 4,000 p.s.i.
8 for a cement with an inherent strength of 5,000 p.s.i.
6.5 for a cement with an inherent strength of 6,000 p.s.i.
5 for a cement with an inherent strength of 7,000 p.s.i.

On the concrete constituent indicator:

Graduation 53 represents 28 days comp. strength.
Lines 48 represent factor $X (X = 17; 12; 8; 6.5$ and $5)$; and
Scale 57 with indicator mark 60 represent water/cement ratio.

When it is desired to make a concrete of a certain strength, and the inherent strength of the cement to be used has been determined, the maximum water/cement ratio is found by shifting upper element 15 relative to lower element 25 to bring the line 50 indicating the strength of this cement opposite the graduation 53 indicating the strength of the desired concrete along the edge 49 of opening 46. This shifts indicator mark 60 along the slot 56 to the point on the scale 57 which indicates the maximum water/cement ratio for the given cement to produce a concrete of the desired strength.

A quantity scale 63 is provided on upper element 15. In this example, an elongated slot 64 is formed in the upper element and extends longitudinally away from pin 34. This slot has longitudinal side edges 65 and 66 along which scales 68 and 69 respectively extend. Scale 68 is graduated to indicate pounds of cement per cubic yard of produced concrete, while scale 69 is graduated to indicate pounds of aggregate per cubic yard of said concrete.

Intermediate element 20 is provided with a plurality of independent sets 72 of quantity lines arranged concentrically around pin 36. Each set 72 includes substantially concentric curved lines 75 and 76 and substantially parallel and straight lines 78 and 79. Lines 75, 76, 78 and 79 are preferably different colors, such as red, blue, purple and green, respectively. As previously stated, intermediate element 20 is preferably circular, and it has a plurality of indicator lines 82 arranged around its periphery. Each indicator line 82 represents a certain fineness modulus of an aggregate. The five illustrated indicators 82 represent fineness moduli expressed as 4.0, 4.5, 5.0, 5.5, and 6.0. It will be noted that there is an indicator 82 for each set 72 of quantity lines. Element 20 may be rotated on pin 36 to bring a desired line 82 into registry with a fixed pointer 85 on end 43 of lower element 25.

Once indicator 10 has been set as described above to show the water/cement ratio necessary to produce concrete of a desired strength from cement of known strength, intermediate member 20 is rotated to bring the indicator line 82 opposite indicator 85 on lower element 25 which represents the fineness modulus of the aggregate to be used. This moves the set 72 of the corresponding quantity line beneath slot 64 through which the pairs 75—76 and 78—79 of lines may be seen. Lines 75—76 are read against scale 69, and lines 78—79 against scale 68. As stated above, angular and rounded aggregates have different cement paste requirements. Red line 75 and purple line 78 are for an angular aggregate, and blue line 76 and green line 79 are for a rounded aggregate. In other words, if the aggregate to be used is angular, line 75 indicates on scale 69 the amount of aggregate required to produce a cubic yard of concrete, and line 78 indicates on scale 68 the amount of cement required to produce the cubic yard of concrete at the indicated water/cement ratio. On the other hand, if rounded aggregate is to be used, line 76 indicates the amount of aggregate on scale 69, and line 79 indicates the amount of cement on scale 68. Thus, indicator 10 may be used to determine the amount of angular or rounded aggregate used to produce a cubic yard of concrete of a desired strength from a cement of known inherent strength. It is obvious that this device may be used to indicate the amounts of cement and aggregate for an established water/cement ratio; the compressive strength of concrete when the cement content, fineness modulus and type of aggregate are known; the amount of aggregate and water necessary to obtain one cubic yard of concrete when the cement content and type of aggregate are known; and how the changes in the amount of water and/or cement and changes in the graduation of the aggregate change the strength of the final concrete.

The amount of water per cubic yard of concrete may easily be calculated. It is only necessary to multiply the amount of cement indicated on scale 68 by the water/cement ratio indicated on scale 57. This will give the amount of water in pounds.

The aggregate used in concrete may be a suitable natural sand-gravel blend, or it may be "built-up" with desired proportions of sand and gravel or rock. Suitable natural blends are rarely available, and should they occur, probably will not have a fineness modulus indicated by any one of the indicator lines 82. However, they will have a fineness modulus between those indicated in this instrument, otherwise they would not be suitable aggregates. In this case, the instrument can still be used.

If, for example, by conventional means the aggregate is found to have a fineness modulus of 5.65 and the water/cement ratio for a certain strength of concrete is determined to be .62, it is necessary to take readings at two settings of intermediate element 20, one at a fineness modulus of 5.5 and the other at 6.0.

The readings for an FM of 5.5 are:

Cement scale 68=465 lbs./c. yd.
Aggregate scale 69=3,495 lbs./c. yd.

And the readings for an FM of 6.0 are:

Cement scale 68=390 lbs./c. yd.
Aggregate scale 69=3,280 lbs./c. yd.

The correct amount of cement for an FM of 5.65 by interpolation is:

$$465 - \frac{(465-390)(5.65-5.5)}{10(6.0-5.5)} = 442.5 \text{ lb./c. yd.}$$

And the correct amount of aggregate for an FM of 5.65 is:

$$3,280 - \frac{(3,495-3,280)(5.65-5.5)}{10(6.0-5.5)} = 3,345.5 \text{ lb./c. yd.}$$

Auxiliary element 30 is provided to assist in the building up of an aggregate to a desired fineness modulus. Element or disc 30 is rotatable on a central pin 88 movably mounted in and movable along an elongated slot 89 formed in lower element 25 beneath intermediate element 20. Disc or element 30 is preferably formed of transparent material, and overlies a grid 90 on the underside of lower element 25. This grid is made up of a plurality of parallel longitudinal lines 92 representing different percentages of sand, said percentages being indicated at 93, intersected by parallel lateral lines 95. These lateral lines represent fineness moduli, and the fineness moduli of sand and gravel are read on their left and right ends at 97 and 98, respectively. Longitudinal lines 92 are parallel with slot 89. A transverse line 99 extends across the element 30 preferably through the centre thereof.

Disc or element 30 is called an FM finder. The FM finder gives a graphical solution for the following formula:

$$P = \frac{MC - M}{MC - MF} \times 100$$

in which:

P=Percentage of sand necessary to obtain a desired FM
MC=FM of coarse aggregate (gravel)
MF=FM of fine aggregate (sand)
M=Desired FM of total blend.

After determining the FM of a sand and of a gravel by conventional means, element or disc 30 is rotated and/or shifted to bring transverse line 99 to intersect the left hand longitudinal line at the FM of the sand, and the right hand longitudinal line at the FM of the gravel. If an aggregate of a desired FM is required, for example, an FM of 6, at the intersection of the lateral line 95 of that FM and line 99 a longitudinal line 92 extends down to a reading indicating the percentage of that sand and, consequently, the percentage of that gravel required to produce the desired aggregate blend.

Concrete constituent indicator 10 may be utilized to build up from sand and gravel an aggregate having a desired fineness modulus. It indicates the water/cement ratio and the quantities of aggregates of different fineness moduli and of cements of different inherent strength to produce concrete of different strengths. Thus, the various elements of this device co-operate to eliminate the necessity for long and tedious calculations, with the possibilities of error, and the necessity of the standard trial and error methods to determine the quantities of the known ingredients to produce concrete of a desired strength and quantity.

What I claim as my invention is:

1. A concrete constituent indicator comprising a first element having a group of strength lines thereon each representing a strength of cement, a second element overlapping and mounted for parallel movement relative to the first element and having graduations thereon each representing a concrete strength and positioned to co-operate with said group of lines, a water/cement ratio scale on one of said elements, an indicator on the other element positioned to make an indication on said scale relative to a reading of each graduation on each strength line, a quantity scale on said second element, and a third element movable with the first element and relative to the second element, said third element having a plurality of independent sets of fineness modulus lines thereon to be positioned along the quantity scale on said second element, said third element being movable selectively to position each set of lines at said scale to indicate quantities of aggregate and cement relative to indicated water/cement ratios and concrete strengths.

2. A concrete constituent indicator comprising a first element having a group of strength lines thereon each representing a strength of cement, a second element overlapping and mounted for parallel movement relative to the first element and having graduations thereon each representing a concrete strength and positioned to co-operate with said group of lines, a water/cement ratio scale on one of said elements and an indicator on the other element positioned to make an indication on said scale relative to a reading of each graduation on each strength line, an aggregate quantity scale on said second element, a cement quantity scale on the second element, and a third element movable with the first element and relative to the second element, said third element having a plurality of independent sets of fineness modulus lines thereon to be positioned along the aggregate and concrete scales on said second element, said third element being movable selectively to position each set of lines at said aggregate and cement scale to indicate quantities of aggregate and cement relative to indicated water/cement ratios and concrete strengths.

3. A concrete constituent indicator as claimed in claim 1 in which each set of fineness modulus lines includes a line for rounded aggregate and another line for angular aggregate.

4. A concrete constituent indicator as claimed in claim 2 in which each set of fineness modulus lines includes a pair of lines to be read with the aggregate scale and another pair of lines to be read with the concrete scale, one line of each pair being for rounded aggregate and the other line of each pair being for angular aggregate.

5. A concrete constituent indicator comprising a first element having a group of strength lines thereon each representing a strength of cement, a second element mounted on the first element for parallel movement thereover and said second element having an opening therein at the group of lines, said opening having a side edge extending over said strength lines, graduations on the second element along said opening side and each representing a concrete strength, a slot formed in the second element, a water/cement ratio scale along a side edge of said slot, and an indicator on the first element at said slot and movable therealong when relative movement between the first and second elements takes place, said indicator being positioned to indicate a water/cement ratio on said scale for each strength line moved to a position adjacent each of said graduations.

6. A concrete constituent indicator comprising a first element having a group of strength lines thereon each representing a strength of cement, a second element overlapping and mounted for parallel movement relative to the first element and having graduations thereon each representing a concrete strength and positioned to cooperate with said group of lines, a water/cement ratio scale on one of said elements and an indicator on the other element positioned to make an indication on said scale relative to a reading of each graduation on each strength line, an aggregate quantity scale on said second element, a cement quantity scale on the second element, and a third element rotatably mounted on and parallel with said second element and movable with the second element beneath the first element, said third element having a plurality of independent sets of fineness modulus lines thereon arranged around the centre of rotation thereof and to be positioned along the aggregate and concrete scales on said second element to indicate quantities of aggregate and cement relative to indicated water/cement ratios and concrete strengths.

7. A concrete constituent indicator as claimed in claim 6 including an indicator in the third element for each set of lines, and a pointer on the first element so positioned that when each third element indicator is moved to said pointer the set of lines of the latter indicator are positioned at the aggregate and concrete scales.

8. A concrete constituent indicator comprising a first element having a group of strength lines thereon each representing a strength of cement, a second element overlapping and mounted for parallel movement relative to the first element and having graduations thereon each representing a concrete strength and positioned to cooperate with said group of lines, a water/cement ratio scale on one of said elements and an indicator on the other element positioned to make an indication on said scale relative to a reading of each graduation on each strength line, a slot formed in the second element and having two side edges, an aggregate scale along one side edge, a cement quantity scale along the other side edge, and a third element rotatably mounted on and parallel with said first element and movable with the first element beneath the second element, said third element having a plurality of independent sets of fineness modulus lines thereon arranged around the centre of rotation thereof and to be moved beneath said slot to indicate quantities on the aggregate and cement scales relative to indicated water/cement ratios and concrete strengths.

9. A concrete constituent indicator as claimed in claim 8 including an indicator in the third element for each set of lines, and a pointer on the first element so positioned that when each third element indicator is moved to said pointer the set of lines of the latter indicator are positioned beneath the second element slot.

10. A concrete constituent indicator comprising an elongated lower element having a group of strength lines thereon each representing a strength of cement, an upper element on and co-extensive with the lower element and pivotally connected thereto near adjacent ends of said elements for parallel movement thereover, said upper element having an opening therein at said group of lines, said opening having a side edge extending over said strength lines, graduations on the upper element along said opening sides and each representing a concrete strength, said opening side and the strength lines being relatively located so that strength graduations may be shifted to selected positions, a slot formed in the upper element, a water/cement ratio scale along a side edge of the slot, and an indicator on the lower element at said slot and movable therealong when relative horizontal movement between the lower and upper elements takes place, said indicator being positioned to indicate a water/cement ratio on said scale for each selected position of the concrete strength graduations over the cement strength lines.

11. A concrete constituent indicator as claimed in claim 10 including a second slot formed in the upper element and having two side edges, an aggregate scale along one side edge, a cement quantity scale along the other side edge, and an intermediate element rotatably mounted on and parallel with the lower element beneath the upper element, said intermediate element having a plurality of independent sets of fineness modulus lines thereon arranged around the centre of rotation thereof and to be moved beneath said second slot to indicate quantities on the aggregate and cement scales relative to indicated water/cement ratios and concrete strengths.

12. A concrete constituent indicator as claimed in claim 11 including an indicator on the intermediate element for each set of lines, and a pointer on the lower element so positioned that when each intermediate element indicator is moved to said pointer the set of lines of the latter indicator are positioned beneath the upper element slot.

References Cited in the file of this patent

UNITED STATES PATENTS

| | | |
|---|---|---|
| 2,247,531 | Thurston et al. | July 1, 1941 |
| 2,339,222 | Hokanson | Jan. 11, 1944 |
| 2,425,097 | Isom | Aug. 5, 1947 |